United States Patent [19]

Demirvont

[11] Patent Number: 4,844,592

[45] Date of Patent: Jul. 4, 1989

[54] CATHODIC ELECTROCHROMIC MATERIAL, METHOD OF MAKING, AND NEW ELECTROCHROMIC DEVICE

[75] Inventor: Hulya Demirvont, Dearborn, Mich.

[73] Assignee: Ford Motor Company, Dearborn, Mich.

[21] Appl. No.: 137,632

[22] Filed: Dec. 24, 1987

[51] Int. Cl.$^4$ ............................ G02F 1/01; G02F 1/17
[52] U.S. Cl. ................................................. 350/357
[58] Field of Search ........................ 350/357, 353, 356

[56] References Cited

U.S. PATENT DOCUMENTS

| | | | |
|---|---|---|---|
| 4,182,551 | 1/1980 | Washida et al. | 350/357 |
| 4,294,520 | 10/1981 | Inoue et al. | 350/357 |
| 4,326,777 | 4/1982 | Kohara et al. | 350/357 |
| 4,416,517 | 11/1983 | Beall et al. | 350/357 |
| 4,693,564 | 9/1987 | Mori | 350/357 |

Primary Examiner—Eugene R. LaRoche
Assistant Examiner—Nathan W. McCutcheon
Attorney, Agent, or Firm—Lorraine S. Melotik; Roger L. May

[57] ABSTRACT

This invention teaches electrochromic lead oxide as a new electrochromic material. An electrochromic device is constructed from this material by forming a cathodic electrochromic device. A fast ion conductor is also provided which is capable of generating ions when an electric field is applied thereto. The fast ion conductor also permits ion movement therethrough while prohibiting electron movement therethrough. The fast ion conductor and the electrochromic lead oxide are arranged between an anode and a cathode to form an electrochromic device. Preferably, the lead oxide is in a layer next to the cathode. With the lead oxide layer next to the cathode, the device is a cathodic electrochromic device which can generate a dark grey color.

14 Claims, 2 Drawing Sheets

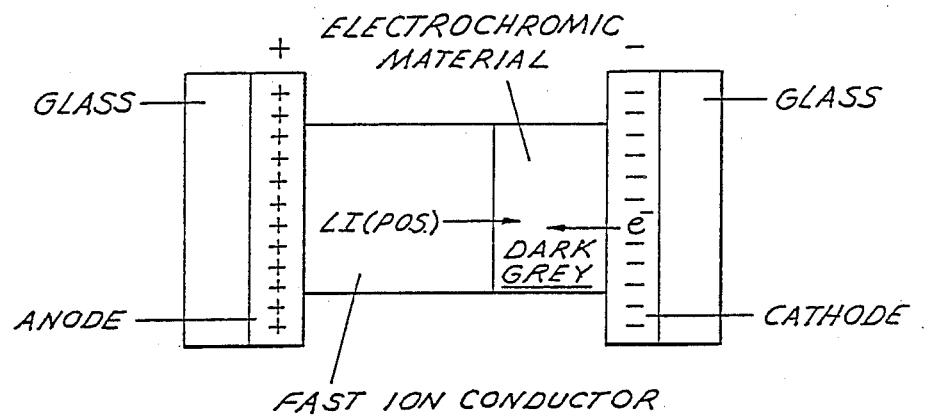

CATHODIC ELECTROCHROMIC MATERIAL, METHOD OF MAKING, AND NEW ELECTROCHROMIC DEVICE

BACKGROUND OF THE INVENTION

1. Field of the Invention

This invention relates to a new cathodic electrochromic material, a method of making the new cathodic electrochromic material, and an electrochromic device utilizing the new material.

2. Description of the Related Art

In order to better understand my inventive contributions, I will first undertake a general discussion of electrochromic behavior in electrochromic materials. Electrochromism is a coloring phenomenon observed in some materials when they are placed in the presence of an electrical field. Such materials are normally uncolored when no electrical field is present, but change to a colored state when an electrical field is placed therearound.

Such a material exhibiting reversible color changes is known as an electrochromic material (ECM). This electrical field dependent transition phenomenon from an uncolored state to a colored state is called optical switching. If a thin coating of such an ECM is placed on a glass support, the entire device is known as a switchable window. When no electrical field is placed on the ECM, it is uncolored and transparent and thus one can look through the window. On the other hand, when an electric field is placed on the ECM, it colors thereby reducing the amount of light transmitted through the window. The reduction of light transmission may be partial or total thereby either reducing the amount of light which passes through the window or eliminating it altogether.

Certain transition metal oxides are known to exhibit electrochromism. Materials such as tungsten oxide, molybdenum oxide, and vanadium oxide are known electrochromic materials.

Electrochromic materials can be divided into the categories depending on the mode of operation of the ECM. The ECM can be either a cathodic ECM or it can be an anodic ECM. The operation of these two types of ECM will be understood by reference to FIGS. 1 and 2.

In FIG. 1, the operation of a cathodic ECM is schematically illustrated. In the cathodic case, an electrochromic material of the cathodic type is physically located next to a cathode which has been placed, for example, on a glass substrate. A fast ion conductor material, which produces light ions (LI) of a positive charge, for example, lithium ions, is placed between the electrochromic material and an anode which also may be placed on a glass substrate.

In the cathodic case, the electrochromic material is subjected to a reduction or gain of electrons when an electric field is applied thereto. Application of the electric field is indicated by the plurality of plus signs shown on the anode and the plurality of negative signs shown on the cathode. As a result of the application of an electric field applied between the anode and the cathode of appropriate strength and sign, positive light ions are driven from the fast ion conductor into the electrochromic material and electrons are supplied to the electrochromic material from the cathode.

The positively charged light ions and the negatively charged electrons associate themselves with the electrochromic material to reduce the same thereby moving the electrochromic material from a base state to a reduced state. In the base state, the electrochromic material is uncolored, but in its reduced state, it is colored.

When the electric field is removed, the electrochromic material will return to its base state, that is, its uncolored state. The period of time required for return of the material to its uncolored state varies from material to material and is generally referred to as the memory of the ECM. Some materials have relatively short memories and others have prolonged memories.

While the operation of the cathodic material has been illustrated by the inclusion in the electrochromic material of positive light ions and negative electrons, the cathodic operation may also take place by the extraction of negative light ions and holes from the electrochromic material respectively to the fast ion conductor and the cathode.

Operation of an anodic ECM is schematically illustrated in FIG. 2. In this case, the electrochromic material is located next to the anode and the fast ion conductor is located between the electrochromic material and the cathode. In the anodic operation, oxidation of the ECM takes place, that is, electrochromism occurs when the ECM loses electrons. The loss of electrons in this case is illustrated by the application of an electric field represented by a plurality of pluses on the anode and the plurality of minuses at the cathode.

In the case of an anodic ECM, when an electric field is applied between the anode and cathode of appropriate strength and sign, negative light ions, such as hydroxyl ions, move from the fast ion conductor into the ECM, and holes moves into the ECM from the anode. As a result of this movement, the ECM loses electrons thereby being oxidized away from its base or uncolored state to a colored state. Once again, the anodic material will return to its base state when the electric field is released. The time of return to its uncolored state again depends on the memory of the ECM.

The anodic ECM may also operate by extracting from the ECM positive light ions and negative electrons respectively to the fast ion conductor and the anode. In this case, the ECM is also oxidized to a colored state.

In general, in either the cathodic ECM or the anodic ECM, the coloring observed in the material is an electrochemical phenomenon produced by the application of an electric field on the ECM to move it from a base condition to a nonbase condition. By applying a field of required strength and direction to cause activity in the ECM, polarization occurs within the entire electrochromic device. In such polarization, a disassociation of ions occurs in the fast ion conductor creating free light ions of the required charge. These light ions move into the ECM because of the electrical field. Once in the ECM, they bond themselves to the molecules of the ECM.

As has been described above, depending on the charge of the bonding ion and its associated electron or hole, oxidation or reduction of the ECM occurs. These ECM materials are normally multivalent state materials exhibiting different optical absorption and dispersion spectra corresponding to different oxidation states. For these ECM's, these different oxidation and reduction states are all stable under appropriate electric field conditions.

In the base ECM, the metal valence states are generally at the maximum, whereby such metal oxides in their base state exhibit the lowest optical absorption. They are generally good insulators with high energy gaps, optically transparent and colorless in such a condition. On the other hand, oxygen deficient oxides as well as the lower valence state oxides created as a result of the application of an electric field exhibit higher optical absorption than those of base oxides. When oxygen deficient, ECM's exhibit a selective absorption when they are in one of their lower valance state oxides. Different ECM exhibit different colors, depending upon the spectral location of the selective absorption bands of that particular oxygen deficient metal oxide.

The explanation so far set forth above of cathodic and anodic ECM is my best explanation. It is possible to reduce this theory of mine to electrochemical equations in which a base ECM, acting as a cathodic material, would be subjected to a reduction by inclusion in the ECM of positive light ions and negative electrons or by extraction from the ECM of negative light ions and holes respectively to the fast ion conductor and the cathode in order to reduce the cathodic ECM to its colored state.

In a similar manner, an electrochemical equation may be written for an anodic ECM in the same manner. In this case, the inclusion of negative light ions and holes in the ECM or the extraction of positive light ions and negative electrons respectively to the fast ion conductor and the anode is sufficient to oxidize the anodic material to a colored state.

I personally conducted a search in the U.S. Patent and Trademark Office on the subject matter of this specification. As a result of that search, I did not uncover any patents which I felt were associated with the subject matter to be taught as the invention herein.

It is an object of this invention to provide a new cathodic electrochromic material.

It is a feature of this invention that a new cathodic electrochromic material is provided.

It is an advantage of this invention that a newly provided cathodic ECM can be switched between an uncolored state and a colored state.

It is another object of this invention to provide an electrochromic device having a new cathodic ECM therein.

It is another feature of this invention that an electrochromic device can be constructed with a newly provided cathodic ECM.

It is another advantage of this invention that an electrochromic device can be constructed using a newly provided cathodic ECM whereby the electrochromic device can be switched between an uncolored state and a colored state.

DISCLOSURE OF THE INVENTION

This invention is directed to a new cathodic electrochromic material. In particular, this invention is directed to a new electrochromic material comprising electrochromic lead oxide. An exact definition of what constitutes electrochromic lead oxide will be given in a later portion of this specification when sufficient information has been given so that the definition can be understood.

The invention is also directed to an electrochromic device. The electrochromic device comprises an anode, a cathode, a fast ion conductor capable of generating ions when an electric field is applied thereto, the fast ion conductor also permitting ion movement therethrough while prohibiting electron movement therethrough, and electrochromic lead oxide. The fast ion conductor and the lead oxide are arranged between the anode and the cathode.

In a preferred embodiment of the inventive electrochromic device, the electrochromic lead oxide is in a layer. The layer of lead oxide is located adjacent the cathode, whereby the electrochromic device is a cathodic device which operates by reduction of the lead oxide when an electric field is applied thereto.

When the cathodic electrochromic device is operated, and a voltage of no greater than about minus five ($-5$) volts is applied between the anode and the cathode, a dark grey color is produced in the cathodic electrochromic device.

The invention also is a method of making a lead oxide electrochromic device. In this method, lead oxide is applied to the cathode of the device by thermally evaporating lead oxide powder ($Pb_3O_4$) in a vacuum of about $10^{-4}$ torr at a suitable evaporation temperature for the $Pb_3O_4$. The $Pb_3O_4$ is spaced from the cathode it is to coat by a distance of about 10 cm. In such a manner, electrochromic lead oxide is applied to the cathode at a rate of thickness build up of from 100 angstroms to 300 angstroms per minute, preferably 200 angstroms per minute. The electrochromic lead oxide coating on the cathode, in accordance with the teachings of a preferred embodiment of the invention, is applied to a thickness in a range of 3000–5000 angstroms, preferably about 4000 angstroms.

BRIEF DESCRIPTION OF THE DRAWINGS

The novel features that are considered characteristic of the invention are set forth with particularity in the appended claims. The invention itself, however, both as to its organization and its method of operation, together with additional objects, features and advantages thereof, will best be understood from the following description of specific embodiments when read in connection with the accompanying drawings in which:

FIG. 3 is a schematic illustration of an operational mode of a cathodic electrochromic device in accordance with this invention in which the electrochromic material is electrochromic lead oxide.

DESCRIPTION OF THE PREFERRED EMBODIMENTS

Figure 1:
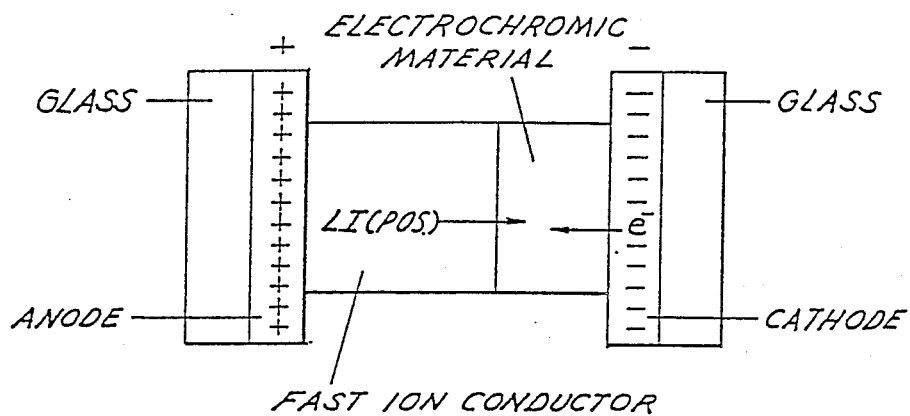
FIGS. 1 and 2, as previously discussed, are schematic illustrations respectively of the operation of a cathodic electrochromic device and of an anodic electrochromic device.
Figure 2:
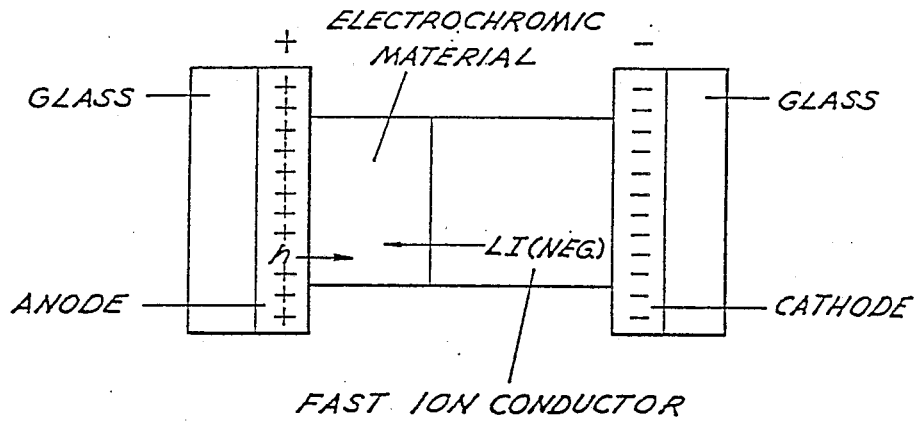

The following description is what I consider to be the preferred embodiments of my invention. The following description also sets forth what I now contemplate to be the best mode of construction for an inventive cathodic electrochromic device. The description is not intended to be a limitation upon the broader principles of this invention.

FIG. 3 schematically illustrates the change of electrochromic lead oxide into a cathodic ECM having a dark grey color. This invention, of course, relates to a cathodic electrochromic device fabricated using as a new electrochromic material, electrochromic lead oxide. This new ECM can alternatively and stably exhibit two different oxidation states one being uncolored when no electric field is applied and the other being dark grey when an electric field of required intensity is applied across the material.

Reference is now made to FIG. 3. In this situation, a cathodic ECM is disclosed. A first glass sheet has an anode thereon and a second glass sheet has a cathode thereon. In both cases, in accordance with the preferred embodiment of my invention, the glass sheets have a thickness of ⅛ inch and the electrodes have a thickness of about 2000 angstroms. In accordance with the teachings of the preferred embodiment, both the anode and the cathode are formed from tin oxide coating doped with fluorine. Such a coating may be applied to the glass sheet by a pyrolytic process, as is well-known in the art. It is, of course, apparent that other electrode materials may be used and other materials may be substituted for the glass sheets, for example, quartz, plastic, etc. Generally, one of the electrode supports should be transparent so that the colors developed in the electrochromic material may be viewed.

As shown in FIG. 3 in the preferred embodiment, the cathodic electrochromic material is positioned adjacent the cathode. In accordance with the teachings of a preferred embodiment of the method of this invention, electrochromic lead oxide is deposited on the cathode by thermal evaporation of red lead oxide powder. Red lead oxide powder is available from many sources. For example, the J. T. Baker Chemical Company sells this powder.

The red lead oxide powder ($Pb_3O_4$) to form the cathodic electrochromic material was loaded in a tantalum boat which was then heated in a vacuum to a temperature below the evaporation temperature of the $Pb_3O_4$ for a period of about one-half hour to condition the powder so that it is in its base state. The temperature was then raised to the evaporation temperature and the thermal evaporation was carried out at a presence of approximately $10^{-4}$ torr of vacuum. The $Pb_3O_4$ powder and the cathode to be coated were spaced from one another by a distance of about 10 cm. In this manner, the electrochromic lead oxide was applied to the cathode at a rate of thickness build up of about 100–300 angstroms per minute, generally controlled to a rate of about 200 angstroms per minute. The coating of electrochromic lead oxide was built up to a thickness of approximately 4000 angstroms. A suitable range is 3000–5000 angstroms thickness for the electrochromic lead oxide. It is, of course, obvious that the thicker the coating, the less transmission of visible light will occur therethrough when the ECM is moved to its colored state.

The electrochromic lead oxide will have a near transparent appearance. The electrochromic lead oxide may have a light grey or light yellow cast so long as it has a near transparent appearance. In this specification and in the attached claims this is what is defined as "electrochromic lead oxide". If the applied lead oxide had a metallic appearance or a deep grey color it is not an "electrochromic lead oxide" and will not form a cathodic electrochromic device.

Thus, while I have illustrated a preferred method of obtaining the electrochromic lead oxide, there will be many other ways of obtaining electrochromic lead oxide which exhibits cathodic electrochromism. If the method selected for placing the lead oxide is one which develops a layer of transparent lead oxide, even though is has a light grey or light yellow cast, then it is a suitable method for applying the electrochromic lead oxide.

The required fast ion conductor is basically two materials. The first material is one which will produce the required light ions and the other is a material which will support the ion producing material, will permit ion movement through the material, and will prohibit electron movement therethrough.

A great number of ion source materials are available, such as LiCl, LiI, AgCl, NaI, NaBr. Of these many materials, and there are a good number more, LiCl was selected because it is preferable due to the high mobility of its ions, their small ionic radius and high discharge voltage.

The material for supporting the ion producing material in accordance with the teachings of the preferred embodiment is polyvinylbutyral. A gel form of polyvinylbutyral is weather-resistant, electrochemically stable, optically nonabsorbing, and capable of being dissolved in a solvent. Additionally, the polyvinylbutyral exhibits good adhesive properties in binding a surface to itself. There are other materials, such as polymers, polyvinylacetate, urethane and acrylics, that exhibit such properties.

In order to prepare the fast ion conductor, the preferred polyvinylbutyral and LiCL were dissolved in a suitable solvent. The solvent should have a high boiling point, high ionic conductivity, high electronic resistivity, and be useful over a range of temperatures. I selected glycol ether DPM as the preferred solvent. Ten percent by weight polyvinylbutyral B-90 powder and ninety percent by weight glycol ether DPM were mixed together. Thereafter, finely divided LiCl was added to the solution until the resistivity of the medium was reduced to approximately 500 ohm-per-centimeter. The solution gelled while it was being stirred at room temperature. The fast ion conductor gel was then sandwiched, as shown in FIG. 3, between the electrochromic layer and the anode. The fast ion conductor had a thickness of approximately 0.1 mm.

In FIG. 3, the cathodic electrochromic device of this invention is illustrated. In this case, when a voltage of no greater than about minus five ($-5$) volts is applied between the anode and the cathode of the cathodic electrochromic device, positive light ions move from the fast ion conductor into the electrochromic material located adjacent the cathode. At the same time, electrons move from the cathode into the electrochromic material located thereagainst. As a result, the electrochromic material is reduced from its base or uncolored state by gaining electrons and it now takes on a different oxidation state from its uncolored state resulting in a dark grey coloring of the electrochromic material. In the preferred embodiment, the positive light ions which are moved into the electrochromic material are lithium ions. Since the fast ion conductor is one which permits ion movement therethrough while prohibiting electron movement therethrough, an electric field is built up across the electrochromic device as is indicated by a plurality of pluses shown at the anode and a plurality of minuses shown at the cathode.

The electrochromic material may be returned to its uncolored or base state by removing the five volt negative charge between the anode and the cathode. The decay of the color in the lead oxide system is rather rapid because the material has a very short memory.

The electrochromic activity of the electrochromic lead oxide may be totally destroyed if a positive voltage of about ten (10) volts is applied between the anode and the cathode of the electrochromic device. If such a voltage is applied it would drive the lead ions into the fast ion conductor from which they could not return upon reversal of the voltage.

In summary, it is apparent that electrochromic lead oxide may be used to form electrochromic cells of the cathodic variety. With respect to the cell of cathodic variety, a voltage of minus five volts applied between the anode and the cathode of the electrochromic device will result in the coloration of the lead oxide as a dark grey electrochromic material.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention. For example, the electrochromic lead oxide, and the fast ion conductor may be mixed together to form a single layer. Also, if one desires to make a dominating cathodic device, one may include other cathodic electrochromic material in with the lead oxide electrochromic material.

I claim:

1. A new electrochromic material comprising electrochromic lead oxide,
said electrochromic lead oxide being made by a method which comprises heating red lead oxide ($Pb_3O_4$) in a vacuum at a temperature below the evaporation temperature of said red lead oxide for a period sufficient to convert said red lead oxide to electrochromic lead oxide.

2. An electrochromic device comprising:
an anode,
a cathode,
a fast ion conductor capable of generating ions when an electrical field is applied thereto, said fast ion conductor permitting ion movement therethrough while prohibiting electron movement therethrough, and
electrochromic lead oxide made by a method which comprises heating red lead oxide ($Pb_3O_4$) in a vacuum at a temperature below the evaporation temperature of said red lead oxide for a period sufficient to convert said red lead oxide to electrochromic lead oxide,
said fast ion conductor and said electrochromic lead oxide being arranged between said anode and said cathode.

3. The electrochromic device of claim 2 wherein: said fast ion conductor and said electrochromic lead oxide form a single layer.

4. The electrochromic device of claim 3 wherein: additional electrochromic materials are included between said anode and said cathode.

5. An electrochromic device comprising:
an anode,
a cathode,
a fast ion conductor capable of generating ions when an electrical field is applied thereto, said fast ion conductor permitting ion movement therethrough while prohibiting electron movement therethrough, and
a layer of electrochromic lead oxide, said electrochromic lead oxide being made by a method which comprises heating red lead oxide ($Pb_3O_4$) in a vacuum at a temperature below the evaporation temperature of said red lead oxide for a period sufficient to convert said red lead oxide to electrochromic lead oxide,
said fast ion conductor and said electrochromic lead oxide layer being arranged between said anode and said cathode.

6. The electrochromic device of claim 5 wherein: additional electrochromic materials are included in said layer of electrochromic lead oxide.

7. The electrochromic device of claim 5 wherein: said electrochromic lead oxide layer is located adjacent said cathode whereby said electrochromic device is a cathodic device which operates by reduction of said lead oxide layer when an electrical field is applied thereto.

8. A method of producing a dark grey color in an electrochromic device by applying a voltage of no greater than about $-5$ volts between said anode and said cathode of the electrochromic device defined in claim 7.

9. A method of making a lead oxide electrochromic device which comprises:
heating red lead oxide ($Pb_3O_4$) in a vacuum at a temperature below the evaporation temperature of said red lead oxide for a time sufficient to convert said red lead oxide to electrochromic lead oxide; and
applying said electrochromic lead oxide to a cathode of the electrochromic device by thermally evaporating said electrochromic lead oxide in a vacuum of about $10^{-4}$ torr and with said $Pb_3O_4$ and sad cathode being spaced from one another by a distance of about 10 cm whereby said electrochromic lead oxide is applied to said cathode at a rate of thickness build up of from 100 A° to 300 A° per minute.

10. The method of making a lead oxide electrochromic device as defined in claim 9 wherein: said electrochromic lead oxide is applied at a rate of thickness build up of 200A° per minute.

11. The method of making a lead oxide electrochromic device as defined in claim 9 wherein: said electrochromic lead oxide is applied to a thickness in a range from 3000 A° to 5000 A°.

12. The method of making a lead oxide electrochromic device as defined in claim 9 wherein: said electrochromic lead oxide is applied to a thickness of about 4000 A°.

13. A method of making a lead oxide electrochromic device which comprises:
heating red lead oxide ($Pb_3O_4$) in a vacuum at a temperature below the evaporation temperature of said red lead oxide for a time sufficient to convert said red lead oxide to electrochromic lead oxide; and
applying said electrochromic lead oxide to a cathode of said electrochromic device by thermally evaporating said electrochromic lead oxide in a vacuum onto said cathode.

14. A method of making electrochromic lead oxide, which method comprises:
heating red lead oxide ($Pb_3O_4$) in a vacuum at a temperature below the evaporation temperature of said red lead oxide for a period sufficient to convert said red lead oxide to electrochromic lead oxide.

* * * * *

UNITED STATES PATENT AND TRADEMARK OFFICE
CERTIFICATE OF CORRECTION

PATENT NO. : 4,844,592
DATED : July 4, 1989
INVENTOR(S) : Hulya Demiryont

It is certified that error appears in the above-identified patent and that said Letters Patent is hereby corrected as shown below:

On the title page, under item [19], "Demirvont" should read --Demiryont--.

On the title page, item [75] should read
--Inventor: Hulya Demiryont, Dearborn, Mich.--

Signed and Sealed this

Fifteenth Day of May, 1990

Attest:

HARRY F. MANBECK, JR.

*Attesting Officer*　　　*Commissioner of Patents and Trademarks*